US007859732B2

(12) United States Patent  (10) Patent No.: US 7,859,732 B2
Imai  (45) Date of Patent: Dec. 28, 2010

(54) OPTICAL SCANNER AND IMAGE FORMING APPARATUS

(75) Inventor: Shigeaki Imai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 321 days.

(21) Appl. No.: 11/961,337

(22) Filed: Dec. 20, 2007

(65) Prior Publication Data

US 2008/0170283 A1  Jul. 17, 2008

(30) Foreign Application Priority Data

Jan. 17, 2007  (JP) .............................. 2007-007562

(51) Int. Cl.
  G02B 26/08  (2006.01)
(52) U.S. Cl. ................................ 359/196.1; 359/216.1
(58) Field of Classification Search ... 359/196.1–199.1, 359/216.1
  See application file for complete search history.

(56) References Cited

U.S. PATENT DOCUMENTS

| 5,808,986 | A | * | 9/1998 | Jewell et al. ............. 369/44.37 |
| 6,353,502 | B1 | * | 3/2002 | Marchant et al. ............ 359/626 |
| 6,813,051 | B2 | | 11/2004 | Suzuki et al. |
| 6,965,466 | B2 | * | 11/2005 | Ishihara ................... 359/204.1 |
| 7,277,212 | B2 | | 10/2007 | Miyatake et al. |
| 2004/0240000 | A1 | | 12/2004 | Miyatake et al. |
| 2005/0190420 | A1 | | 9/2005 | Imai et al. |
| 2006/0158711 | A1 | | 7/2006 | Imai et al. |
| 2006/0158771 | A1 | | 7/2006 | Imai et al. |
| 2007/0058255 | A1 | | 3/2007 | Imai et al. |
| 2007/0146849 | A1 | | 6/2007 | Miyatake et al. |
| 2007/0236557 | A1 | | 10/2007 | Imai et al. |

FOREIGN PATENT DOCUMENTS

JP   2004-287292   10/2004
JP   2005-250319   9/2005

OTHER PUBLICATIONS

U.S. Appl. No. 12/174,899, filed Jul. 17, 2008, Saisho, et al.
U.S. Appl. No. 12/207,739, filed Sep. 10, 2008, Imai.
U.S. Appl. No. 12/208,479, filed Sep. 11, 2008, Imai.

* cited by examiner

*Primary Examiner*—Euncha P Cherry
(74) *Attorney, Agent, or Firm*—Oblon, Spivak, McClelland, Maier & Neustadt, L.L.P.

(57) ABSTRACT

A scanning optical system is configured such that at least a smaller value of the size in a main scanning direction of optical beams entering into an opening provided in an aperture member relative to the size of the opening of the aperture member in the main scanning direction and the size in a sub scanning direction of the optical beams entering into the opening relative to the size of the opening in the sub scanning direction is equal to or larger than 1 and equal to or smaller than 2.

20 Claims, 8 Drawing Sheets

OPTICAL SCANNER AND IMAGE FORMING APPARATUS

CROSS-REFERENCE TO RELATED APPLICATIONS

The present application claims priority to and incorporates by reference the entire contents of Japanese priority document 2007-007562 filed in Japan on Jan. 17, 2007.

BACKGROUND OF THE INVENTION

1. Field of the Invention

The present invention relates to an optical scanner in an image forming apparatus.

2. Description of the Related Art

Conventionally, as an image forming apparatus that forms an image by using the Carlson process, for example, the one that forms a latent image on a surface of a rotating photosensitive drum by scanning optical beams via a polygon mirror, and fixes a toner image obtained by visualizing the latent image on a sheet of paper as a recording medium, thereby forming an image has been known. In recent years, this type of image forming apparatus has been frequently used for simple printing as an on-demand printing system, and therefore demands for higher densification of the image and speed-up of image output are increasing.

One approach to speed up image output, is to increase the rotation speed of the polygon mirror that deflects the optical beams and rotation speed of the photosensitive drum. However, with an increase in the rotation speed of the polygon mirror, noise and vibrations from a drive system and power consumption increase, thereby deteriorating overall durability of the apparatus. Speed-up of image output has a trade-off relationship with densification of the image. In other words, with an increase in the rotation speed of the polygon mirror, the image quality degrades.

Therefore, as a method of achieving both the higher densification of the image and higher image-output speed, such a method has been proposed that a light source emits multi-beams to scan the photosensitive drum with a plurality of optical beams at a time (for example, see Japanese Patent Application Laid-open No. 2005-250319 and Japanese Patent Application Laid-open No. 2004-287292). The methods described in these patent documents collectively deflect diverging rays from a vertical-cavity surface-emitting laser (VCSEL) having a plurality of luminous points by the polygon mirror, in a state with the diverging rays being coupled by a coupling lens, thereby enabling to scan the photosensitive drum simultaneously with the optical beams.

To emit multi-beams from the light source, for example, a method that employs a plurality of edge emitting type laser diodes (LDs) as the light source and a method that employs one-dimensional or two-dimensional edge-emitting type laser array as the light source can be considered. When the edge emitting type LD is used as the light source, a general-purpose LD (LD that emits only one beam) can be used, thereby enabling production cost reduction. However, it is difficult to stably maintain the positions of the LD and the coupling lens between a plurality of LDs, and nonuniformity of scanning line interval is likely to occur. Accordingly, it is difficult to achieve higher densification of the image. Further, because the number of LDs that can be arranged receives a constraint, it is difficult to simultaneously achieve the higher densification and the higher image-output speed.

Further, when the edge-emitting type laser array in which the luminous points are arranged one-dimensionally is used, the scanning line interval by the optical beams can be made uniform. However, the power consumption by the light source increases. When the number of beams is increased too much, a deviation amount of the optical beams from the optical axis of optical elements constituting an optical system increases, thereby causing a problem such that optical characteristics of the apparatus deteriorate.

On the other hand, because the vertical-cavity surface-emitting laser emits the optical beams vertically with respect to a substrate, two-dimensional integration of the luminous points is easy, and the power consumption can be reduced by one digit as compared to the edge emitting type element. Accordingly, it is advantageous in realizing super densification of the image and speed-up of image output.

However, there is a major problem in the vertical-cavity surface-emitting laser in that it is difficult to achieve high output of the optical beams due to a small volume of an active layer. For example, the output of the edge emitting type semiconductor laser generally used in an optical scanner in the image forming apparatus is about 7 milliwatts to 10 milliwatts, whereas the output of the current vertical-cavity surface-emitting laser is about 1 milliwatt to 2 milliwatts. Therefore, to realize higher image-output speed using the vertical-cavity surface-emitting laser, the optical beams need to be used more effectively as compared to a case that the edge emitting type light source is used.

Specifically, the semiconductor lasers that include the vertical-cavity surface-emitting laser has a variation of the divergence angle for each laser element. The variation causes a change in effective numerical aperture (NA) in the optical system in the optical scanner, and also causes a variation of beam spot diameter and an increase of the beam spot diameter on the surface to be scanned. To avoid these problems, a beam width of the beams emitted from the laser element to be guided onto an image surface is shaped by using an aperture member. However, if the aperture member is used, light use efficiency (quantity of light reaching the image surface out of the quantity of light emitted from the light source) decreases. Thus, there is a need to improve the light use efficiency when the vertical-cavity surface-emitting laser is used as the light source.

SUMMARY OF THE INVENTION

It is an object of the present invention to at least partially solve the problems in the conventional technology.

According to an aspect of the present invention, there is provided an optical scanner that deflects optical beams emitted from a light source and having passed through an opening provided in an aperture member toward a main scanning direction, to scan a surface to be scanned. At least a smaller value of the size in a main scanning direction of the optical beams entering into the opening relative to the size of the opening in the main scanning direction and the size in a sub scanning direction, which is orthogonal to the main scanning direction, of the optical beams entering into the opening relative to the size of the opening in the sub scanning direction is equal to or larger than 1 and equal to or smaller than 2.

According to another aspect of the present invention, there is provided an image forming apparatus that forms a multicolored image by superposing and fixing toner images formed based on a latent image for each color obtained from information relating to the multicolored image on a recording medium. The image forming apparatus includes the above optical scanner; a plurality of photoconductors on which the latent image corresponding to each color is respectively formed by the optical scanner; a developing unit that manifests the latent images respectively formed on surfaces to be scanned of the photoconductors; and a transfer unit that superposes and fixes toner images manifested by the developing unit on the recording medium.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
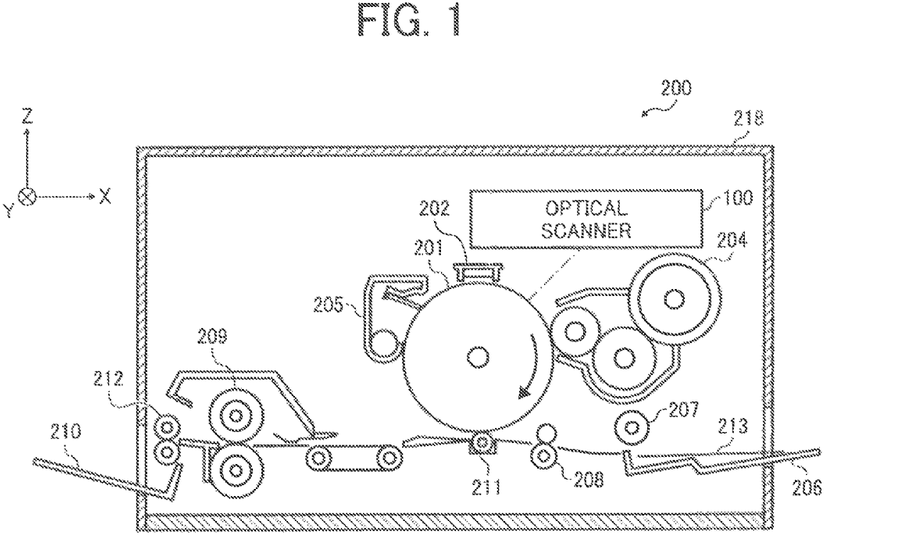
FIG. 1 is a schematic diagram of a printer according to an embodiment of the present invention.

Exemplary embodiments of the present invention will be explained with reference to FIGS. 1 to 10. FIG. 1 is a schematic diagram of an internal structure of an image forming apparatus 200 according to an embodiment of the present invention.

The image forming apparatus 200 is a printer that prints an image by transferring a toner image on plain paper (sheet), using the Carlson process. The image forming apparatus 200 includes, as shown in FIG. 1, an optical scanner 100, a photosensitive drum 201, a charger 202, a toner cartridge 204, a cleaning case 205, a paper feed tray 206, a paper feed roller 207, a registration roller pair 208, a transfer charger 211, a fuser roller 209, a paper ejection roller 212, a paper ejection tray 210, and a housing 215 for housing these.

The housing 215 is substantially hexahedron, and an opening that communicates with an internal space is formed on walls on +X side and −X side thereof.

The optical scanner 100 is arranged on the upper part of the housing 215, and scans the surface of the photosensitive drum 201 by deflecting the optical beams modulated based on image information in a main scanning direction (Y-axis direction in FIG. 1). The configuration of the optical scanner 100 is described later.

The photosensitive drum 201 is a columnar member, on which a photosensitive layer is formed, which has a property such that when the optical beams are irradiated onto the surface of the photosensitive drum 201, the portion becomes conductive. The photosensitive drum 201 is arranged below the optical scanner 100, with the Y-axis direction being set as a longitudinal direction, and rotated in the clockwise direction in FIG. 1 (direction shown by arrow in FIG. 1) by a rotation mechanism (not shown). The charger 202 is arranged at a position of 12 o'clock in FIG. 1 (upper side), the toner cartridge 204 is arranged at a position of 2 o'clock, the transfer charger 211 is arranged at a position of 6 o'clock, and the cleaning case 205 is arranged at a position of 10 o'clock, around the photosensitive drum 201.

The changer 202 is arranged with a predetermined clearance on the surface of the photosensitive drum 201, to charge the surface of the photosensitive drum 201 with a predetermined voltage.

The toner cartridge 204 includes a cartridge body in which the toner is filled, and a developing roller charged with a voltage of reverse polarity to that of the photosensitive drum 201, and supplies the toner filled in the cartridge body onto the surface of the photosensitive drum 201 via the developing roller.

The cleaning case 205 includes a rectangular cleaning blade with the Y-axis direction being set as the longitudinal direction, and is arranged so that one end of the cleaning blade comes in contact with the surface of the photosensitive drum 201. The toner attracted to the surface of the photosensitive drum 201 is removed by the cleaning blade, with the rotation of the photosensitive drum 201, and collected in the inside of the cleaning case 205.

The transfer charger 211 is arranged with the predetermined clearance on the surface of the photosensitive drum 201, and a voltage of the reverse polarity to that of the charger 202 is applied thereto.

The paper feed tray 206 is arranged in a state with the +X side end being protruded from the opening formed on the side wall on the +X side of the housing 215, and can accommodate a plurality of sheets 213 provided from outside.

The paper feed roller 207 picks up the sheet 213 one by one from the paper feed tray 206 and guides the sheet 213 into a gap formed between the photosensitive drum 201 and the transfer charger 211 via the registration roller pair 208 including a pair of rotation rollers.

The fuser roller 209 includes a pair of rotation rollers, heats and pressurizes the sheet 213, and guides the sheet 213 to the paper ejection roller 212.

The paper ejection roller 212 includes a pair of rotation rollers, and sequentially stacks the sheet 213 carried from the fuser roller 209 on the paper ejection tray 210 arranged in a state with the −X side end being protruded from the opening formed on the side wall on the −X side of the housing 215.

Figure 2:
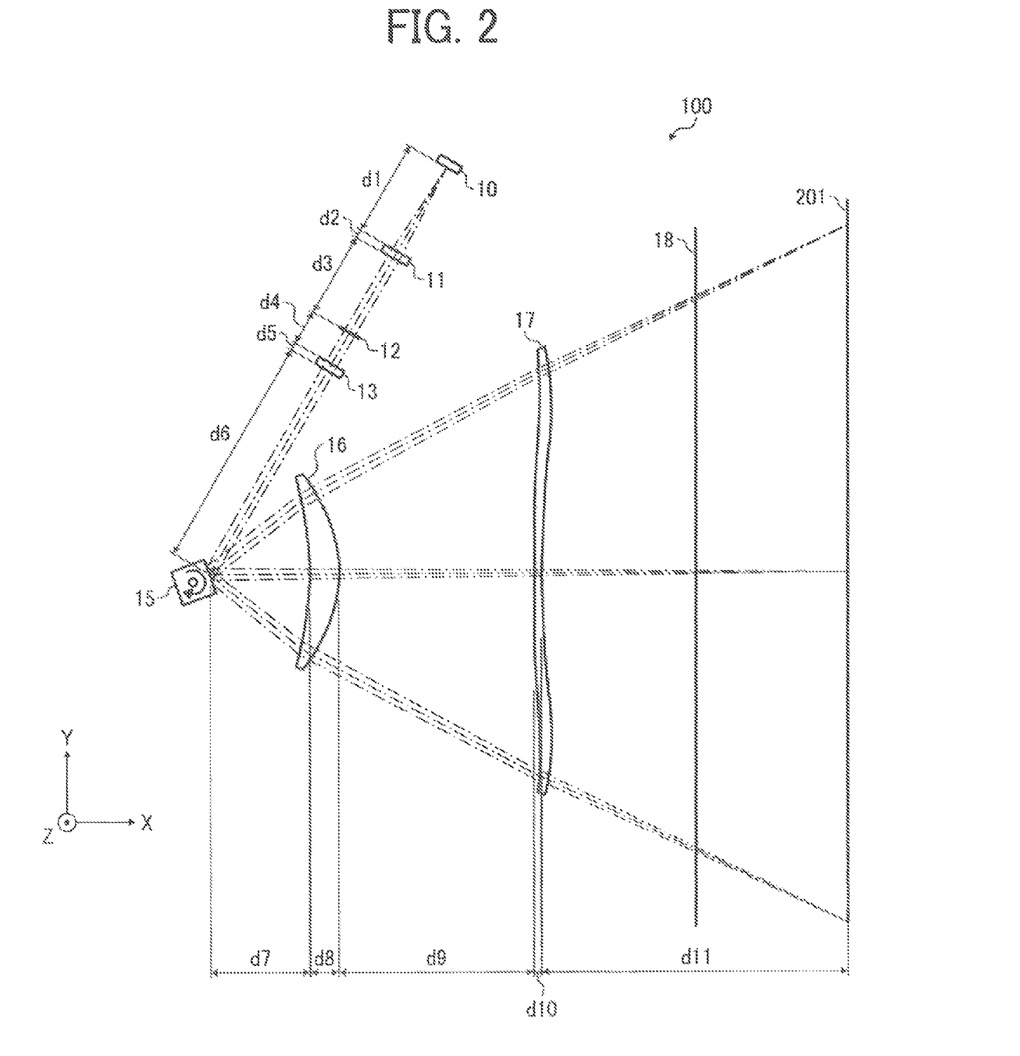
FIG. 2 is a detailed schematic diagram of an optical scanner shown in FIG. 1.

FIG. 2 is a detailed schematic diagram of an internal structure of the optical scanner 100. The optical scanner 100 includes a light source 10, and a coupling lens 11, an aperture member 12, a line-image forming lens 13, and a polygon mirror 15 sequentially arranged obliquely downward to the left at an angle of 60 degrees from the light source 10, a first scanning lens 16 and a second scanning lens 17, and a reflecting mirror 18 that reflects and guides the optical beams passed through the second scanning lens 17 to the photosensitive drums 201, sequentially arranged on the +X side of the polygon mirror 15. A coordinate system in which the array direction of the coupling lens 11, the aperture member 12, the line-image forming lens 13, and the polygon mirror 15 is designated as X-axis direction is defined below, and explanations will be given based on the coordinate system.

Figure 3:
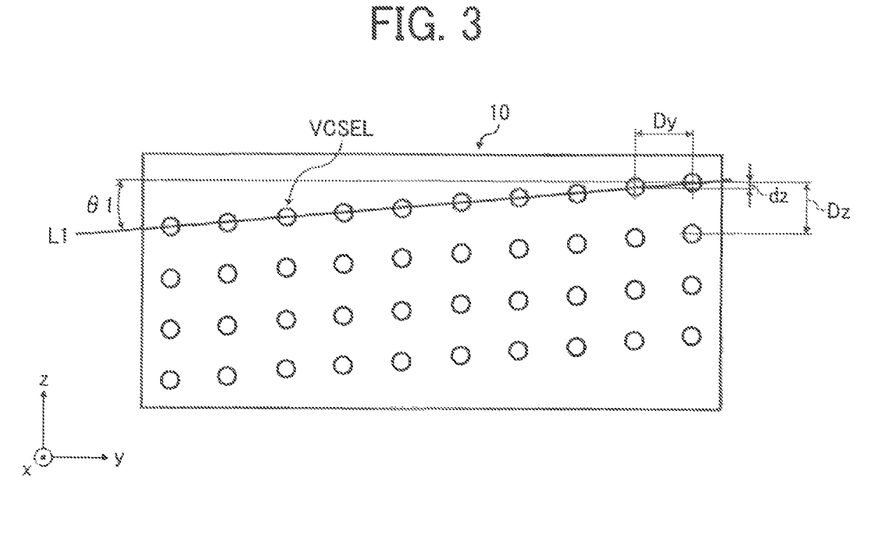
FIG. 3 depicts a light source shown in FIG. 2.

The light source 10 is a vertical-cavity surface-emitting laser array in which, for example, VCSELs are two-dimensionally arranged as the luminous points, and as shown in FIG. 3, and 40 VCSELs are arranged in a matrix of 4 columns by 10 rows in which a direction parallel to a straight line L1 forming an angle θ1 with the Y-axis is designated as a column direction and a direction parallel to Z-axis is designated as a row direction, on a light emitting surface (a surface on the −X side). A column interval Dz is 44.4 micrometers, a row interval Dy is 30 micrometers, and an interval dz of the luminous points adjacent to each other in the Z-axis direction (sub scanning direction) of the respective VCSELS is 4.4 micrometers (=Dz/10).

The element intervals Dy and Dz need to be determined by taking into consideration an influence of a thermal interference from another element at the time of the operation of the light source. Because the element interval in the main scanning direction having no influence of densification in the sub scanning direction is enlarged, a space required for inserting wiring of each element can be ensured without being affected by the thermal interference between the respective elements.

Figure 4:
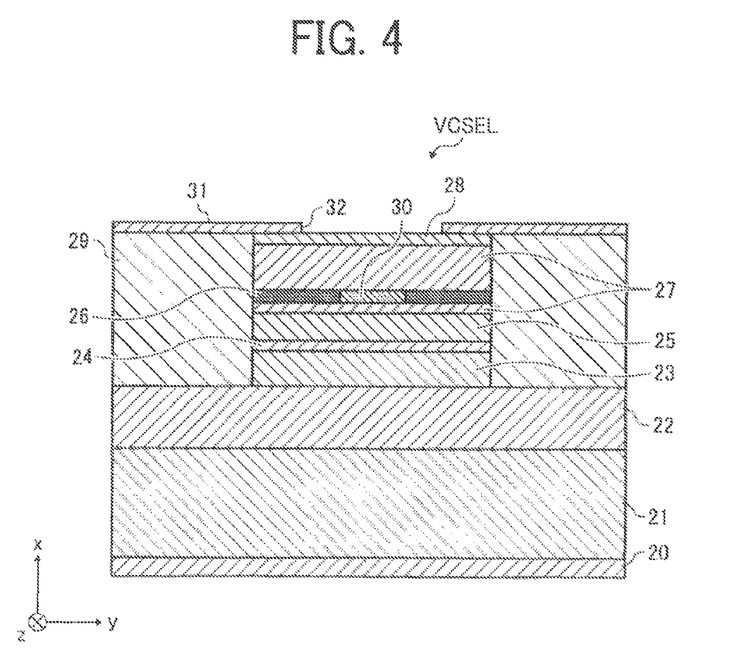
FIG. 4 is a sectional view of a VCSEL in a light source shown in FIG. 3.
Figure 5:
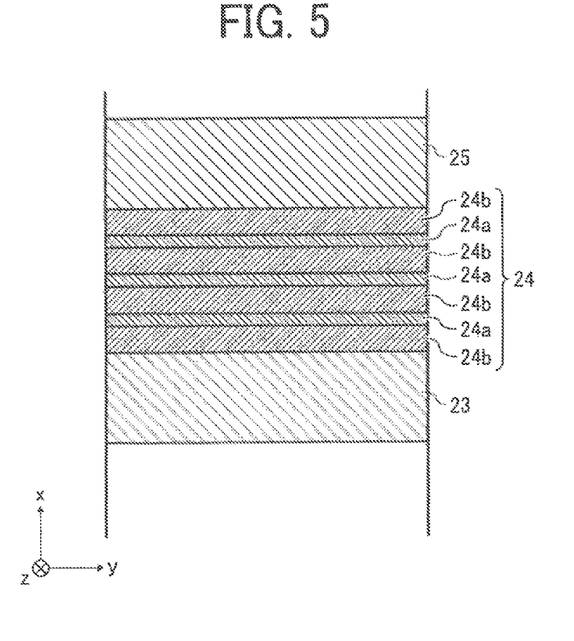
FIG. 5 is an enlarged view of an exemplary configuration of an active layer of the VCSEL shown in FIG. 4.

FIG. 4 is a schematic of a sectional structure of the VCSEL, and FIG. 5 is an enlarged view around the active layer in FIG. 4. Each VCSEL is of 780-nm band. As seen from FIGS. 4 and 5, each VCSEL includes an active layer 24 including a quantum well layer 24a made of $Al_{0.12}Ga_{0.88}As$ and a barrier layer 24b made of $Al_{0.3}Ga_{0.7}As$, on an n-GaAs substrate 21 on which an n-side electrode 20 is formed. A resonator area having one wavelength optical thickness, which includes the active layer 24 and spacer layers 23 and 25 made of $Al_{0.6}Ga_{0.4}As$, is put between a lower reflecting mirror 22 including 40.5 pairs of an $n-Al_{0.3}Ga_{0.7}As$ high refractive layer and an $n-Al_{0.9}Ga_{0.1}As$ low refractive layer and an upper reflecting mirror 27 including 24 pairs of a $p-Al_{0.3}Ga_{0.7}As$ high refractive layer and a $p-Al_{0.9}Ga_{0.1}As$ low refractive layer, with each layer having λ/4 optical thickness. An AlAs-selected oxide layer 30 surrounded by an AlxOy-current constriction layer 26 is provided in the upper reflecting mirror 27 away from the resonator area by λ/4. A composition graded layer (not shown) in which composition is gradually changing due to a decrease of a value of resistance is included between the respective layers of the reflecting mirrors 22 and 27.

A method of forming the VCSEL is explained below. The respective layers are formed by crystal growth using an organometallic vapor phase growing method (MOCVD method) or a molecular-beam epitaxy method (MBE method).

A mesa shape is formed by forming a groove having a depth of, for example, 4.5 micrometers around an area, which becomes the element area, by a dry etching method. The etching bottom is generally provided at a position at least exceeding the AlAs-selected oxide layer 30.

The AlAs-selected oxide layer 30 with the side being exposed is heat-treated in water vapor to oxidize the circumference thereof, thereby changing the circumference to an $Al_xO_y$ insulator layer according to a groove forming process using etching, and thereby forming a current constriction structure in which the channel of element drive currents is restricted only to the unoxidized AlAs region in a central part.

An $SiO_2$ protective layer (not shown) having a thickness of, for example, 150 nanometers is provided, exceeding the region where an upper electrode (p-side individual electrode) 31 is formed on each element region and a light emitting part 32, and a polyimide 29 is filled in the etched portion to planarize the portion.

The polyimide 29 and the $SiO_2$ protective layer (not shown) on the upper reflecting mirror including a p-contact layer 28 and the light emitting part in each element region are removed, to form the p-side individual electrode 31 on a part other than the light emitting part 32 on the p-contact layer 28, and form an n-side electrode on a lower face of the n-GaAs substrate 21.

In the present embodiment, the mesa portion formed by the dry etching method becomes each vertical-cavity surface-emitting laser element. As a method of forming the array of the luminous points of the light source 10, a photomask is formed along the array of the luminous points, an etching mask is formed by a general photolithographic process, to form the array by etching. It is desired to provide a groove of a size of from 4 micrometers to 5 micrometers between elements to separate respective elements in the array electrically and spatially. This is because if the groove is too narrow, etching control becomes difficult. The mesa shape can be any shape such as elliptical and rectangular such as square and oblong, other than the circular shape as in the present embodiment. The size (diameter and the like) is preferably 10 micrometers or more. This is because if the size is too small, heat is accumulated at the time of driving the elements, thereby deteriorating the characteristic.

Figure 6:
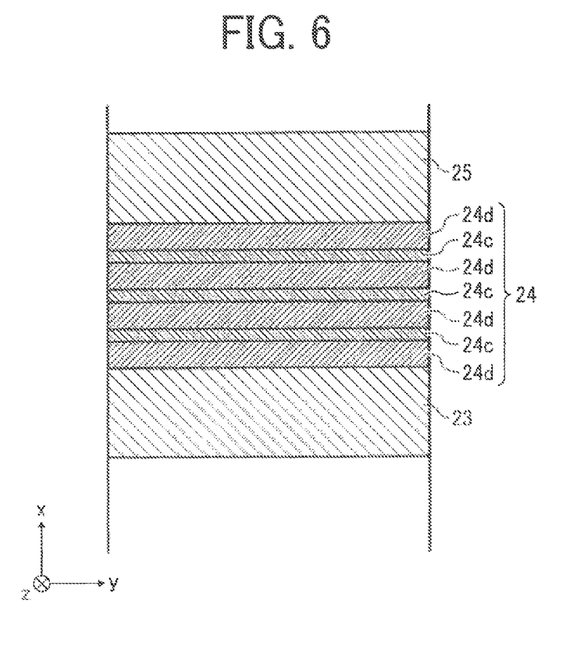
FIG. 6 is an enlarged view of another exemplary configuration of the active layer of the VCSEL shown in FIG. 4.

The 780-nm band vertical-cavity surface-emitting laser can be made of other materials. FIG. 6 is an enlarged diagram of around the active layer made of other materials. As shown in FIG. 6, the active layer includes three GaInPAs quantum-well active layers 24c having a compressive strain composition and a band gap wavelength of 780 nanometers, and four $Ga_{0.6}In_{0.4}P$ barrier layers 24d having a tensile strain, which are lattice-matched with each other. As cladding layers (in the present embodiment, spacer layers) 23 and 25 for confining electrons, $(Al_{0.7}Ga_{0.3})_{0.5}In_{0.5}P$ is used, which is a wide band gap. In this case, a large band gap difference between the cladding layer and the quantum-well active layer can be ensured, as compared to a case that the cladding layers for confining electrons are formed of the AlGaAs system.

Table 1 shows band gap differences between the spacer layer and the well layer, and the barrier layer and the well layer, in a typical material composition of 780-nm and 850-nm vertical-cavity surface-emitting lasers of AlGaAs (spacer layer)/AlGaAs (quantum-well active layer) system, and 780-nm vertical-cavity surface-emitting laser of AlGaInP (spacer layer)/GaInPAs (quantum-well active layer) system. The spacer layer means a layer between the active layer and the reflecting mirror in the general configuration, having a function as the cladding layer for confining carriers.

As shown in Table 1, it is seen that when the 780-nm vertical-cavity surface-emitting laser of AlGaInP (spacer layer)/GaInPAs (quantum-well active layer) system is used, the band gap difference can be made larger than that of the 850-nm vertical-cavity surface-emitting laser of AlGaAs (spacer layer)/AlGaAs (quantum-well active layer) system as well as the 780-nm vertical-cavity surface-emitting lasers of AlGaAs (spacer layer)/AlGaAs (quantum-well active layer) system. Specifically, the band gap difference between the cladding layer and the active layer is as large as 767 megaelectron volts, as compared to 466 megaelectron volts (in the case of Al composition of 0.6) when the cladding layer is formed of AlGaAs. There is also a dominant band gap difference between the barrier layer and the active layer, thereby realizing excellent carrier confinement.

TABLE 1

| | | Wavelength | |
|---|---|---|---|
| | | 780 nm | 850 nm (Ref.) |
| | | Spacer layer/quantum-well active layer of AlGaAs/AlGaAs material | Spacer layer/quantum-well active layer of AlGaInP/GaInPAs material | Spacer layer/quantum-well active layer of AlGaAs/GaAs material |
| Spacer layer | | $Al_{0.6}Ga_{0.4}As$ (Eg = 2.0226 eV) | $(Al_xGa_{1-x})_{0.5}In_{0.5}P$ (Eg(X = 0.7) = 2.324 eV) | $Al_{0.6}Ga_{0.4}As$ (Eg = 2.0226 eV) |
| Active layer | Quantum-well active layer | $Al_{0.12}Ga_{0.88}As$ (Eg = 1.5567 eV) | GaInPAs (Compressive strain) (Eg = 1.5567 eV) | GaAs (Eg = 1.42 eV) |
| | Barrier layer | $Al_{0.3}Ga_{0.7}As$ (Eg = 1.78552 eV) | $Ga_xIn_{1-x}P$(Tensile strain) (Eg(X = 0.6) = 2.02 eV) | $Al_{0.3}Ga_{0.7}As$ (Eg = 1.78552 eV) |
| Eg difference between spacer layer and well layer (ΔEg) | | 465.9 meV | 767.3 meV | 602.6 meV |
| Eg difference between barrier layer and well layer (ΔEg) | | 228.8 meV | 463.3 meV | 365.5 meV |

Further, because the active layer has a compressive strain, an increase of gain becomes large due to band separation between a heavy hole and a light hole. Accordingly, high gain can be obtained, thereby enabling high output with low threshold. This effect cannot be obtained by 780-nm or 850-nm vertical-cavity surface-emitting laser made of AlGaAs system having a lattice constant approximately the same as that of a GaAs substrate. Further, a reflectivity of DBR on a light extracting side can be decreased by setting a threshold to a low value due to improvement of carrier confinement and high gain by the strained quantum-well active layer, thereby enabling a higher output.

The active layer and the barrier layer are made of a material that does not contain Al, to form an Al-free active region (the quantum-well active layer and a layer adjacent thereto). Therefore, uptake of the air is reduced to suppress the formation of a non-radiative recombination center, thereby extending the service life. Accordingly, a write unit or a light source unit can be reused.

Returning to FIG. 2, the coupling lens 11 has a focal length of 47.7 millimeters, and forms the optical beams from the light source 10 in approximately parallel beams.

The aperture member 12 has a rectangular opening with a size of 5.44 millimeters in the Y-axis direction (main scanning direction) and a size of 2.10 millimeters in the Z-axis direction (sub scanning direction), arranged so that the center of the opening is positioned near the focal position of the coupling lens 11.

The line-image forming lens 13 is a cylindrical lens having a focal length of 107.0 millimeters, with a first face (incident face) having a refracting power in the Z-axis direction (sub scanning direction) and a second face (emission face) having a refracting power in the Y-axis direction (main scanning direction), so that the optical beams having passed through the aperture member 12 are imaged in the sub scanning direction near the reflecting surface of the polygon mirror 15.

The polygon mirror 15 is a quadratic prism member having a square upper face inscribed with a circle having a radius of 7 millimeters. The polygon mirror 15 has a plane of polarization respectively formed on four sides thereof, and is rotated about an axis parallel to the Z-axis at a constant angular velocity by a rotation mechanism (not shown). Accordingly, the optical beams incident to the polygon mirror 15 are deflected (scanned) in the Y-axis direction.

The first scanning lens 16 and the second scanning lens 17 are resin scanning lenses, respectively, having a thickness at the center (on the optical axis) of 13.5 millimeters and 3.5 millimeters. The shapes of the optical surface thereof are expressed by functions indicated in the following equations 1 and 2, respectively. Y denotes a coordinate in the main scanning direction, designating the position of the optical axis as an origin, Rm denotes a radius of curvature of the lens, $a_{00}$, $a_{01}$, $a_{02}$, . . . denote aspheric coefficients of a main scanning shape, $R_{so}$, denotes a curvature on the optical axis in the sub scanning direction, and $b_{00}$, $b_{01}$, $b_{02}$, . . . denote aspheric coefficients of a sub scanning shape. Values of respective coefficients are as shown in Table 2 below.

TABLE 2

$$X(Y) = \frac{\frac{Y^2}{R_m}}{1 + \sqrt{1 - (1 + a_{00}) \cdot \left(\frac{Y}{R_m}\right)^2}} + a_{01} \cdot Y + a_{02} \cdot Y^2 + a_{03} \cdot Y^3 + a_{04} \cdot Y^4 + \ldots \quad (1)$$

$$Cs(Y) = \frac{1}{R_{s0}} + b_{01} \cdot Y + b_{02} \cdot Y^2 + b_{03} \cdot Y^3 + \ldots \quad (2)$$

| | First scanning lens | | Second scanning lens | |
|---|---|---|---|---|
| | First face | Second face | First face | Second face |
| $R_m$ | −120 | 59.279 | −10000 | 540.625 |
| $R_{s0}$ | −500 | −600 | 521.92 | −40.751 |
| $a_{00}$ | 0 | 0 | 0 | 0 |
| $a_{04}$ | $8.88524 \times 10^{-7}$ | $9.22409 \times 10^{-7}$ | $3.28563 \times 10^{-7}$ | $1.27798 \times 10^{-7}$ |
| $a_{06}$ | $-2.62914 \times 10^{-10}$ | $6.77825 \times 10^{-11}$ | $-7.08542 \times 10^{-11}$ | $-4.62873 \times 10^{-11}$ |
| $a_{08}$ | $2.18464 \times 10^{-14}$ | $-4.11244 \times 10^{-14}$ | $6.26922 \times 10^{-15}$ | $4.04921 \times 10^{-15}$ |
| $a_{10}$ | $1.36766 \times 10^{-17}$ | $1.3728 \times 10^{-17}$ | $-2.73157 \times 10^{-19}$ | $-1.65975 \times 10^{-19}$ |
| $a_{12}$ | $-3.13542 \times 10^{-21}$ | $2.06956 \times 10^{-21}$ | $4.73881 \times 10^{-24}$ | $2.58548 \times 10^{-24}$ |
| $b_{01}$ | 0 | $-1.59477 \times 10^{-6}$ | $7.57567 \times 10^{-7}$ | 0 |
| $b_{02}$ | 0 | $-4.33213 \times 10^{-6}$ | $-1.1328 \times 10^{-6}$ | $2.31146 \times 10^{-7}$ |
| $b_{03}$ | 0 | $4.98199 \times 10^{-9}$ | $2.60617 \times 10^{-10}$ | 0 |
| $b_{04}$ | 0 | $-2.85938 \times 10^{-9}$ | $7.89614 \times 10^{-11}$ | 0 |
| $b_{05}$ | 0 | $-2.67713 \times 10^{-12}$ | $-5.02709 \times 10^{-14}$ | 0 |
| $b_{06}$ | 0 | $2.87783 \times 10^{-13}$ | $1.40512 \times 10^{-14}$ | 0 |
| $b_{07}$ | 0 | $-1.91653 \times 10^{-15}$ | $4.55389 \times 10^{-18}$ | 0 |
| $b_{08}$ | 0 | $2.04238 \times 10^{-15}$ | $-2.01401 \times 10^{-18}$ | 0 |
| $b_{09}$ | 0 | $1.01413 \times 10^{-18}$ | $-1.54602 \times 10^{-22}$ | 0 |
| $b_{10}$ | 0 | $-6.7299 \times 10^{-19}$ | $7.48935 \times 10^{-23}$ | 0 |

In the optical scanner 100, lateral magnification in the sub scanning direction as the entire optical scanner 100 is 2.18, and lateral magnification in the sub scanning direction of the optical system (scanning optical system) after the polygon mirror 15 is 0.97. The focal length in the main scanning direction of the scanning optical system is 237.8 millimeters, the focal length in the sub scanning direction is 71.4 millimeters, and a write width to the photosensitive drum 201 is ±161.5 millimeters. A spot diameter of the optical beam on the surface of the photosensitive drum 201 is aimed at 52 micrometers in the main scanning direction and 55 micrometers in the sub scanning direction. As shown in FIG. 2, sizes of optical distances between the light source 10 and respective elements, d1, d3, d4, d6, d7, d9, and d11, and sizes of respective elements in the optical axis direction, d2, d5, d8, and d10 are as shown in Table 3 below, as an example.

TABLE 3

Unit: mm

| d1 | d2 | d3 | d4 | d5 | d6 | d7 | d8 | d9 | d10 | d11 |
|---|---|---|---|---|---|---|---|---|---|---|
| 46.06 | 3.0 | 47.69 | 12.85 | 3.0 | 108.7 | 46.31 | 13.50 | 89.73 | 3.50 | 141.36 |

The operation of the image forming apparatus 200 is explained next. Upon reception of the image information from a host device, the optical scanner 100 is driven by modulation data based on the image information, and 40 optical beams modulated based on the image information are emitted from the light source 10. These optical beams are formed substantially in parallel beams by the coupling lens 11, and pass through the aperture member 12. In the optical scanner 100, when the beam diameter of the optical beam before passing through the aperture member 12 is defined as $1/e^2$, the beam diameter is set to a circle (diameter) of 9.58 mm×9.58 mm. The spot diameter thereof is respectively adjusted by passing through the aperture member 12.

The respective optical beams passed through the aperture member 12 are focused on a plane of polarization of the polygon mirror 15 by the line-image forming lens 13. After the respective optical beams are deflected in the Y-axis direction by the polygon mirror 15, and the traveling speed and the like in the main scanning direction of the optical beam spot are adjusted by the first scanning lens 16 and the second scanning lens 17, the optical beams are focused on the surface of the photosensitive drum 201 via the reflecting mirror 18.

Because the surface of the photosensitive drum 201 is charged by a predetermined voltage by the charger 202, charges are distributed with certain charge density. When the photosensitive drum 201 is scanned by the optical beams deflected by the polygon mirror 15, carriers (charges) are generated in a photosensitive layer to which the optical beams are irradiated, and charge transfer occurs in this part to decrease the potential. Accordingly, because the photosensitive drum 201 rotating in the direction of arrow in FIG. 1 is scanned by the optical beams modulated based on the image information, an electrostatic latent image specified by the distribution of the charges is formed on the surface of the photosensitive drum.

When the electrostatic latent image is formed on the surface of the photosensitive drum 201, the toner is supplied to each surface of the photosensitive drum 201 by the developing roller of a toner cartridge 203. At this time, because the developing roller of the toner cartridge 203 is charged by the voltage having a reverse polarity to that of the photosensitive drum 201, the toner adhered to the developing roller is charged to the same polarity as that of the photosensitive drum 201. Accordingly, the toner does not adhere to the part on the surface of the photosensitive drum 201 where the charges are distributed, and the toner adheres only to the scanned part, thereby forming a toner image on the surface of the photosensitive drum 201 by visualizing the electrostatic latent image. The toner image is adhered to the sheet 213 by the transfer charger and fixed by the fuser roller 209, and formed as an image on the sheet. The sheet 213 on which the image is formed in this manner is ejected by the paper ejection roller 212, and sequentially stacked on the paper ejection tray 210.

According to the optical scanner 100 in the present embodiment, the size of the opening provided in the aperture member 12 is 5.44 millimeters in the main scanning direction, and 2.10 millimeters in the sub scanning direction. On the other hand, the size of the beam diameter (the diameter defined by $1/e^2$) of the optical beam entering into the aperture member 12 is 9.58 millimeters in the both main and sub scanning directions. The sizes in the main and sub scanning directions of the opening provided in the aperture member 12 are respectively defined here as am and as, and the sizes of the beam diameter in the main and sub scanning directions of the optical beam passing through the aperture member 12 are respectively defined as wm and ws. At this time, size Cm (=wm/am) and size Cs (=ws/as) of wm and ws with respect to the am and as in the main and sub scanning directions are 1.76 (=9.58/5.44) and 4.56 (=9.58/2.10), respectively, and the smaller value (1.76) of Cm and Cs is in a range of from 1 to 2 inclusive. Accordingly, because the respective optical beams emitted from the light source 10 pass through the aperture member 12, a difference in the spot diameter can be suppressed, thereby enabling to improve the light use efficiency of the optical beams. The reason thereof is described in detail with reference to a characteristic curve shown in FIG. 7.

It is considered here to image the optical beams of uniform strength having passed through the aperture member 12. The optical beams of uniform strength mean optical beams having infinite sizes (wm and ws) in the main and sub scanning directions. The optical beams of uniform strength are expressed here as uniform light.

If it is assumed that the spot diameter of the uniform light formed on the focal position of the lens when the uniform light enters into the aperture member is 1, a relationship between the ratio of the spot diameter of the uniform light with respect to the sizes in the main and sub scanning directions of the opening in the aperture member (hereinafter, C) and the spot diameter of the uniform light on the focal position of the lens (hereinafter, "standardized beam spot diameter") is indicated by a curve specified by black circles in FIG. 7. Further, a relationship between the ratio C and a transmission factor of the aperture member is indicated by a curve specified by white circles in FIG. 7.

Figure 7:
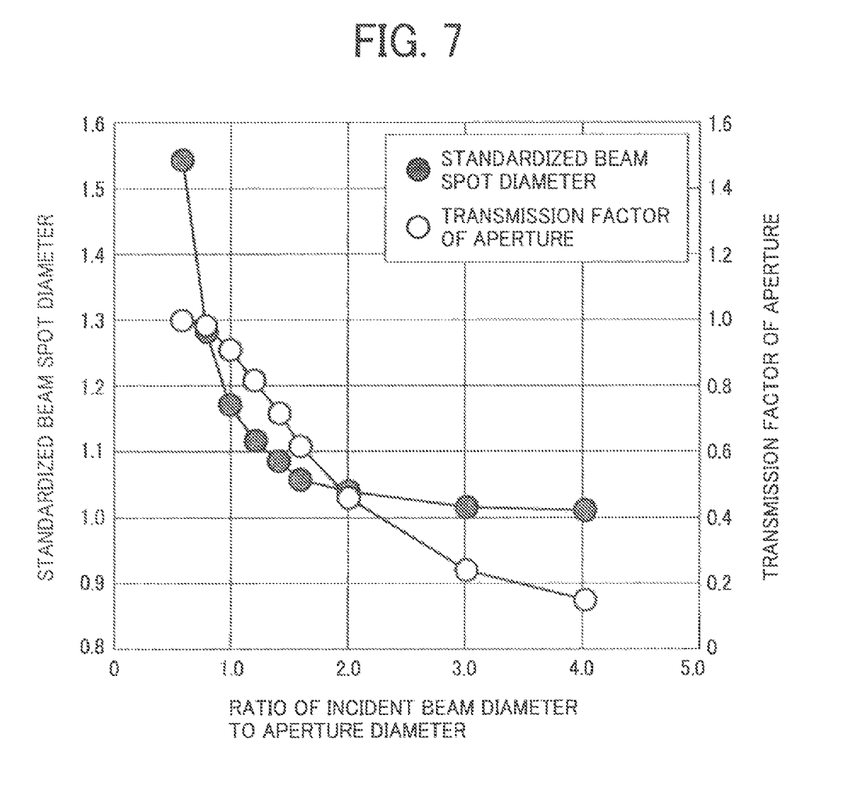
FIG. 7 is a schematic diagram for explaining a ratio of a spot diameter of optical beams with respect to the size of an opening provided in an aperture member shown in FIG. 2.

As shown in FIG. 7, when the ratio C becomes smaller than 1, inclination of the curve with respect to the standardized beam spot diameter changes sharply. This indicates that when there is a difference in the divergence angle of the light source or there is a difference in the spot diameter of the optical beams entering into the aperture member, the spot diameters of the optical beams at the focal position of the lens are largely different. The difference in the spot diameters of the optical beams at the focal position of the lens causes degradation of the output image in the image forming apparatus.

On the other hand, when the ratio C is larger than 2, the change of the standardized beam spot diameter with respect to the change of the ratio C is substantially 0. This indicates that when the divergence angle of the light source varies, the beam spot diameter at the focal position of the lens hardly changes, which is desirable. When the value of the ratio C increases, the transmission factor of the aperture member becomes very small. Accordingly, the quantity of light becomes short, and the high-speed and high-density optical scanning cannot be realized. When the ratio C is made larger than 2, the effect of providing the aperture member (even if the divergence angle of light source varies, the beam spot diameter at the focal position of lens hardly changes) is hardly improved, and therefore it is desired to set the ratio C to a value equal to or less than 2.

Accordingly, it is desired to set the divergence angle of the light source and the focal length of the coupling lens so that the ratio C is in a range of equal to or larger than 1 and equal to or less than 2. Consequently, the use efficiency of the optical beams can be improved, while controlling the difference in the spot diameter of the optical beams on the surface to be scanned, thereby enabling to realize high-speed and high-density scanning.

When it is considered to use the optical scanner of the present invention in the image forming apparatus, a difference in the beam spot diameter hardly affects the image, because an image is generally formed by using pulse width modulation (PWM) in the main scanning direction. However, a difference in the beam spot diameter in the sub scanning direction is likely to affect the image such as density nonuniformity, and this phenomenon becomes noticeable in a multicolored image forming apparatus, and color nonuniformity easily occurs. Accordingly, the effect of suppressing degradation of image quality of the output image is increased by reducing the difference in the beam spot diameter in the sub scanning direction rather than in the main scanning direction. Therefore, the ratio Cm of the spot diameter to the size in the main scanning direction of the opening provided in the aperture member is decreased than the ratio Cs of the spot diameter to the size in the sub scanning direction of the opening provided in the aperture member. That is, the ratio of the incident beam diameter to the opening provided in the aperture member is set to be smaller in the main scanning direction than in the sub scanning direction, and the divergence angle of the light source and the focal length of the coupling lens are set so that the ratio Cm is in a range of equal to or larger than 1 and equal to or less than 2. Consequently, the quantity of light on the surface to be scanned can be increased, while further suppressing degradation of the output image, thereby enabling to realize the high-speed and high-density optical scanner.

Most desirably, ratios Cm and Cs are equal to or larger than 1 and equal to or less than 2. The light use efficiency can be improved by setting the ratios in this range, while suppressing the difference in the beam spot diameter at the focal position of the lens. More desirably, Cm is set to be smaller than Cs due to the reason described above.

When the vertical-cavity surface-emitting laser is used, the effect by improving the use efficiency of the optical beams is larger than the case that the edge emitting laser is used. This is because the vertical-cavity surface-emitting laser has a large structural problem in realizing high output. The power consumption of the vertical-cavity surface-emitting laser is smaller than that of the edge emitting laser by about one digit, which is advantageous in reducing environmental loading. Further, the vertical-cavity surface-emitting laser has a large potential relative to high-speed and high-density optical scanning because a two-dimensional array can be easily formed structurally. However, in the vertical-cavity surface-emitting laser, because the active layer is small, currently there is a major problem in obtaining high output, such that the quantity of light by the edge emitting laser is 7 to 10 milliwatts, whereas the quantity of light by the vertical-cavity surface-emitting laser is 1 to 2 milliwatts. This becomes a large obstacle to realization of the high-speed and high-density optical scanner. Therefore, when the vertical-cavity surface-emitting laser is used as the light source, the use efficiency of the optical beams can be improved by increasing the transmission factor of the aperture member by the above method, thereby enabling to realize the high-speed and high-density optical scanner.

Approximately circular beams are normally emitted from the vertical-cavity surface-emitting laser, and the divergence angles in two directions orthogonal to each other are substantially equal. The opening in the aperture member used for the optical scanner generally has a shape long in the main scanning direction than in the sub scanning direction. Accordingly, the beams emitted from the vertical-cavity surface-emitting laser are made elliptic to vary the divergence angles in the two orthogonal directions, thereby enabling to improve the transmission factor of the aperture member.

The transmission factor of the aperture member can be also improved by approximating the shape of the opening provided in the aperture member to a square (widening the width in the sub scanning direction), instead of making the spot shape of the optical beams emitted from the vertical-cavity surface-emitting laser elliptic. However, magnification in the sub scanning direction of the optical system becomes large. If the magnification in the sub scanning direction of the optical system becomes large, when a two-dimensionally arranged light source such as the vertical-cavity surface-emitting laser array is used, an interval between the scanning lines is enlarged, and therefore high-density optical scanning cannot be realized. If the element interval in the sub scanning direction of the vertical-cavity surface-emitting laser array is made narrow, even if the magnification in the sub scanning direction is large, high-density optical scanning is possible. However, this is difficult to be realized due to a problem in manufacturing the elements and a problem such as thermal interference between elements, and therefore the magnification in the sub scanning direction needs to be set small. Therefore, it is desired to make the optical beams emitted from the vertical-cavity surface-emitting laser elliptic and vary the divergence angles in the two orthogonal directions.

As a method of setting the divergence angle in the main scanning direction of the optical beams emitted from the vertical-cavity surface-emitting laser to be larger than that in the sub scanning direction, it can be considered to vary a light-confined state in a resonator between the main scanning direction and the sub scanning direction. Specifically, because the light confined in a narrow width has a large divergence angle, the light-confined state needs only to be set narrower in the main scanning direction than in the sub scanning direction. To achieve this, the width of the current constriction structure needs to be set to be wider in the sub scanning direction than in the main scanning direction. The current constriction structure means the shape of the selected nonoxidizing region when the AlAs-selected oxide layer 30 is used. As another current constriction structure, a method in which a proton-injected high-resistance region is provided in a part of the upper reflecting mirror 27 (DBR mirror) is generally known. In this case, the width of a region in which proton injection is not performed needs only to be set such that the width in the sub scanning direction becomes wider than that in the main scanning direction. The shape of the current constriction structure can be oblong or elliptic, or can be any other shape. As another method, by using a property such that the light emitted from the narrow emitting part has a large divergence angle due to the influence of diffraction, the shape of the light emitting part 32 can be made such that the width in the main scanning direction becomes narrower than that in the sub scanning direction. The structural shape of the light emitting part 32 can be oblong or elliptic, or can be any other shape. Further, the above two methods are preferably used together, and by using the two methods together, the amount of the divergence angle, which can be varied in the main and sub scanning directions, can be increased.

The divergence angle in the main scanning direction and the sub scanning direction of the vertical-cavity surface-emitting laser is preferably set so that a ratio between the main scanning direction and the sub scanning direction of the opening provided in the aperture member 12 (the size of the opening in the main scanning direction/the size of the opening in the sub scanning direction) substantially agree with the ratio between the main scanning direction and the sub scanning direction of the spot diameter (the diameter defined by $1/e^2$) of the optical beam on the aperture member 12 (spot diameter in the main scanning direction/sport diameter in the sub scanning direction). By setting the divergence angle in this manner, the light emitted from the vertical-cavity surface-emitting laser can be used most efficiently. At this time, the divergence angle in the main and sub scanning directions of the vertical-cavity surface-emitting laser and the focal length of the coupling lens are preferably set so that the ratios Cm and Cs between the main scanning direction and the sub scanning direction are both in the range of equal to or larger than 1 and equal to or less than 2.

When the optical scanner is constructed by using the two-dimensional laser array as in the vertical-cavity surface-emitting laser, the aperture member 12 needs to be installed near the focal position on the rear side of the coupling lens 11. It is because the beams from the two-dimensional laser array intersect with each other near the focal position on the rear side of the coupling lens 11. At this time, if a manufacturing error occurs, the position where the beams from the two-dimensional laser array intersect with each other deviates from the central position of the aperture member 12, thereby decreasing the quantity of light transmitted through the aperture member 12 (the transmission factor of the aperture member), and therefore the quantity of light can become insufficient on the surface to be scanned. This phenomenon appears more noticeably when the ratios Cm and Cs between the main and sub scanning directions become both in the range of from 1 to 2 inclusive. In this case, the position or an inclination amount of the light source unit (mainly formed of the light source 10 (vertical-cavity surface-emitting laser) and the coupling lens 11) is preferably adjusted. Consequently, a decrease of the transmission factor of the aperture member due to the manufacturing error can be corrected. From a standpoint of simplification of an adjusting mechanism, it is desired to adjust the inclination amount of the light source unit.

To correct a decrease of the transmission factor of the aperture member 12 due to the manufacturing error, it is more desirable to adjust the position of the aperture member 12. Because it is easier to adjust the aperture member than to adjust the light source unit, the adjusting mechanism is more simplified, thereby enabling to reduce the cost of the apparatus and reduce the adjustment time. At this time, the aperture member can be three-dimensionally adjusted in the optical axis direction and in a direction orthogonal to the optical axis, or can be adjusted only in one direction of these two directions; however, it is desired to adjust the aperture member three-dimensionally. The optical axis is defined by the element positioned in the center of the two-dimensional laser array.

Figure 8:
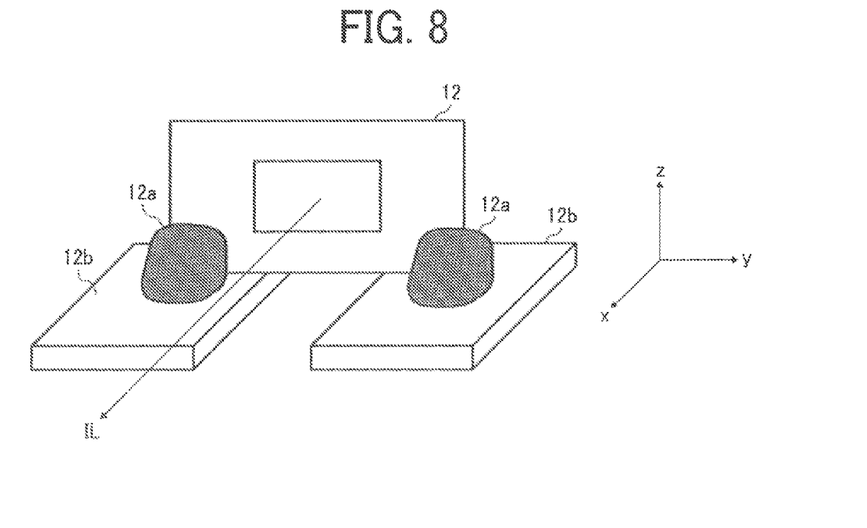
FIG. 8 is a schematic diagram for explaining an example of an adjusting method of the aperture member shown in FIG. 2.
Figure 9:
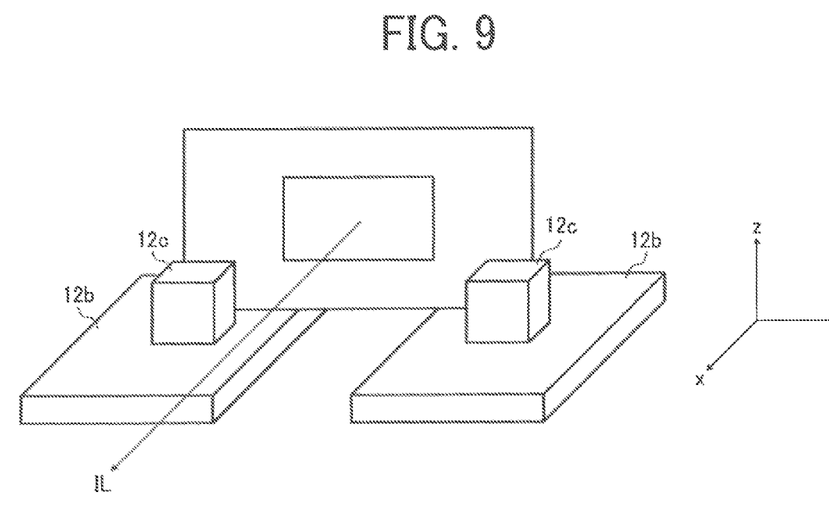
FIG. 9 is a schematic diagram for explaining another example of the adjusting method of the aperture member.
Figure 10:
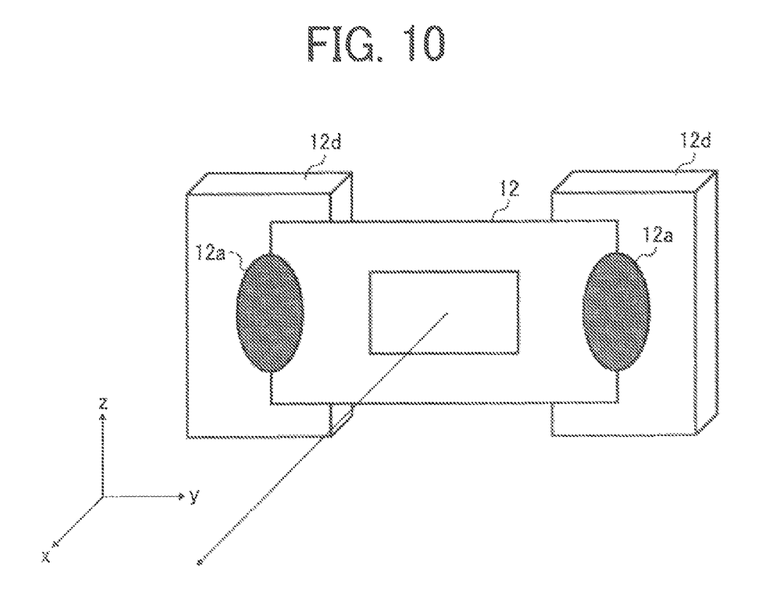
FIG. 10 is a schematic diagram for explaining still another example of the adjusting method of the aperture member.

Specifically, the position of the aperture member 12 is three-dimensionally adjusted, and after the adjustment, as shown in FIG. 8, the aperture member is adhered (aerial adhesion) to a non-adhesive object 12b such as a support member via an adhesive 12a in a floated state, thereby enabling easy adjustment of the aperture member 12 at a low cost, and therefore the transmission factor of the aperture member relative to the optical beams can be favorably ensured. Further, as shown in FIG. 9, after the position of the aperture member is three-dimensionally adjusted, the aperture member can be fixed to the non-adhesive object 12b via an intermediate member 12c. Furthermore, for example, as shown in FIG. 10, the position of the aperture member 12 is first regulated in the X-axis direction (optical axis direction) by a non-adhesive object 12d, taking into consideration that the crossing position of optical beams from the two-dimensional laser array is likely to deviate in a direction orthogonal to the optical axis direction rather than in the optical axis direction. The position of the aperture member 12 can be then adjusted two-dimensionally dimensionally in the direction orthogonal to the optical axis direction, and fixed to the non-adhesive object 12d via the adhesive 12a.

It has been explained that the position of the aperture member 12 is near the focal position on the rear side of the coupling lens 11. However, the position of the aperture member 12 is not limited thereto, and can be deviated from the focal position on the rear side of the coupling lens 11.

The coupling lens 11 and the line-image forming lens 13 can be respectively made of glass, or resin for reducing the cost. When these are made of resin, these can be a diffraction optical system for reducing deterioration of the optical characteristics due to a temperature change.

In the image forming apparatus 200 of the present invention, a line image is formed on the surface of the photosensitive drum 201 by the optical beams, whose use efficiency is improved by the optical scanner 100. Therefore, image fading does not occur due to insufficient quantity of light, thereby enabling to form a high density image at high speed.

In the present embodiment, a case that the optical scanner 100 is used for a monochrome image forming apparatus 200 has been explained. However, as another embodiment, the image forming apparatus is also applicable to a color image, and can be a tandem color-copying machine including a plurality of photosensitive drums.

Figure 12:
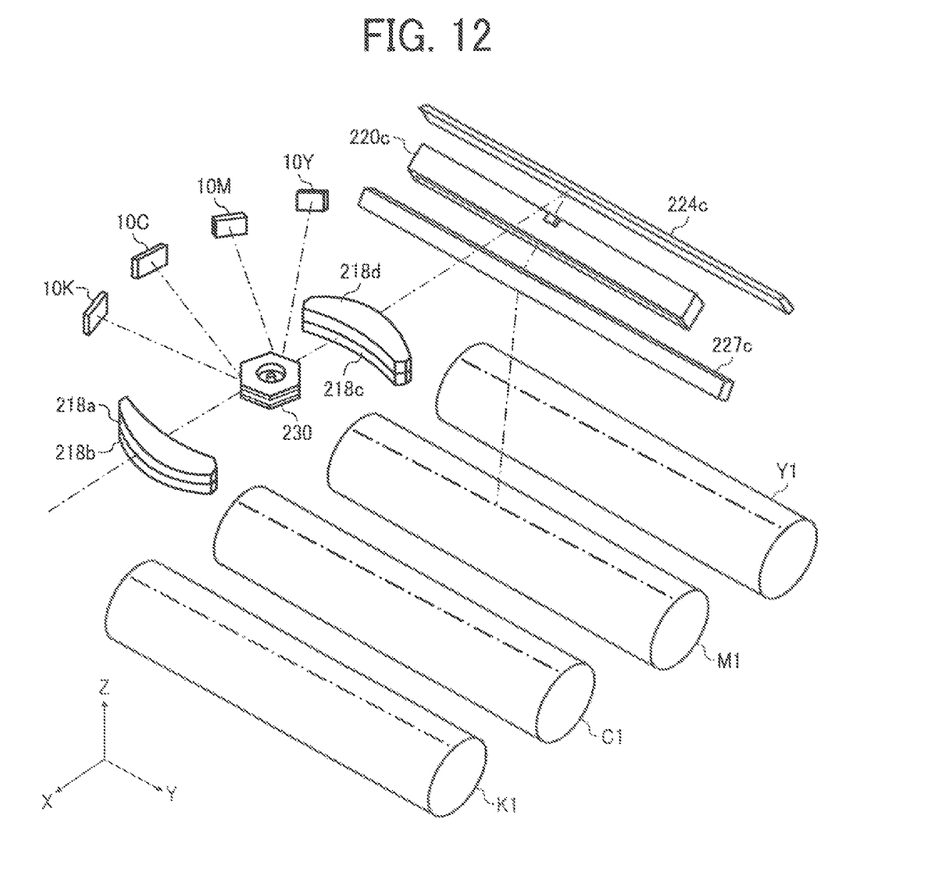
FIG. 12 is a perspective view of an optical scanner shown in FIG. 11.
Figure 13:
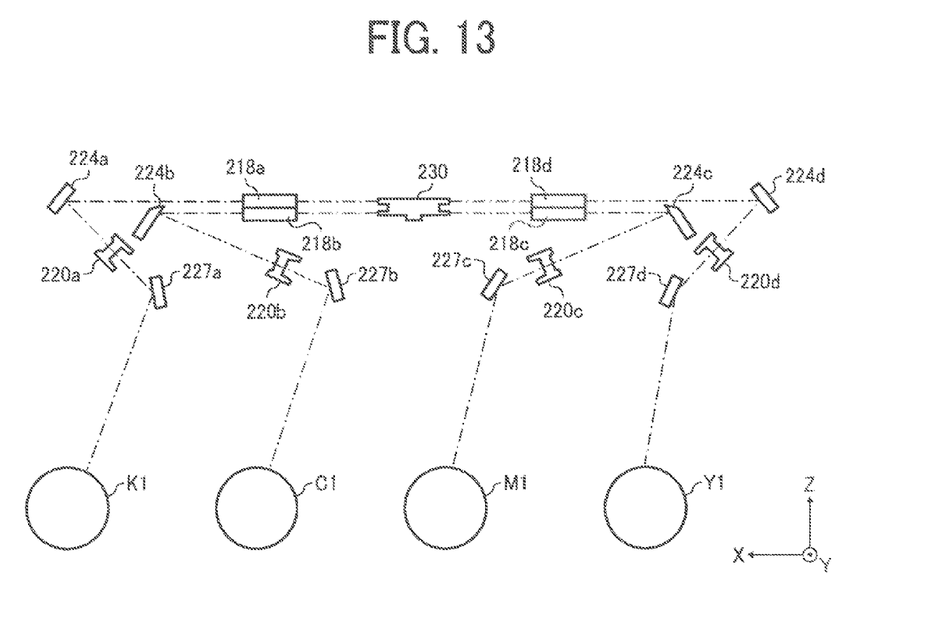
FIG. 13 is a side view of the optical scanner shown in FIG. 11.

A tandem color-copying machine 300 including the photosensitive drums corresponding to the color image is explained with reference to FIGS. 11 to 13. The tandem color-copying machine 300 includes a photosensitive drum K1, a charger K2, a developing unit K4, a cleaning unit K5, and a transfer charger K6 for black (K), a photosensitive drum C1, a charger C2, a developing unit C4, a cleaning unit C5, and a transfer charger C6 for cyan (C), a photosensitive drum M1, a charger M2, a developing unit M4, a cleaning unit M5, and a transfer charger M6 for magenta (M), and a photosensitive drum Y1, a charger Y2, a developing unit Y4, a cleaning unit Y5, and a transfer charger Y6 for yellow (Y), an optical scanner 900, a transfer belt 901, and a fuser 902.

Figure 11:
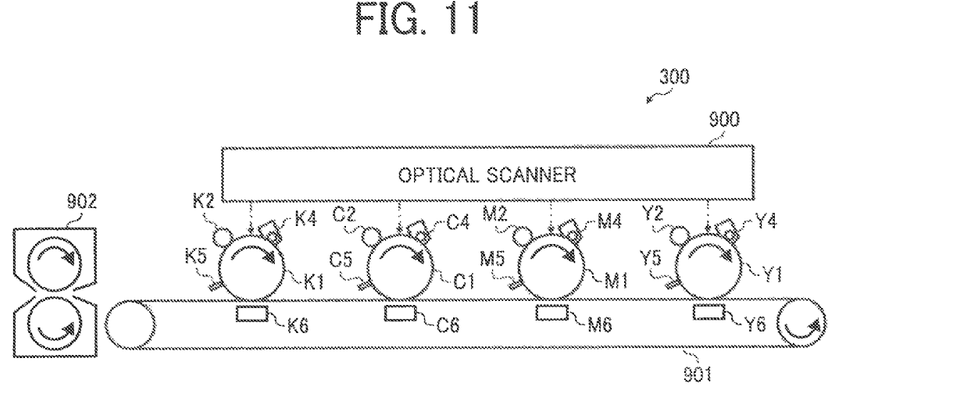
FIG. 11 is a schematic diagram of a tandem color-copying machine according to an embodiment of the present invention.

Each photosensitive drum rotates in a direction indicated by arrow in FIG. 11, and the charger, the developing unit, the transfer charger, and the cleaning unit are respectively arranged in order of rotation. The respective chargers uniformly charge the surface of the corresponding photosensitive drum. The beams are irradiated by the optical scanner 900 onto the surface of each photosensitive drum charged by the charger to form an electrostatic latent image on the photosensitive drum. A toner image is formed on the surface of the photosensitive drum by the corresponding developing unit. The toner image of respective colors is transferred to recording paper by the corresponding transfer charger, and the image is finally fixed on the recording paper by the fuser 902.

The optical scanner 900 is explained with reference to FIGS. 12 and 13.

The optical scanner 900 includes four light source units 10K, 10C, 10M, and 10Y, and the coupling lens 11, the aperture member 12, and the like as in the optical scanner 100. The optical scanner 900 also includes an optical system (not shown) that leads the optical beams from the respective light source units 10K, 10C, 10M, and 10Y to a polygon mirror 230, the polygon mirror 230, four first scanning lenses 218a, 218b, 218c, and 218d, eight folding mirrors 224a, 224b, 224c, 224d, 227a, 227b, 227c, and 227d, and four second scanning lenses 220a, 220b, 220c, and 220d. Only a part of the optical scanner 900 is shown in FIGS. 12 and 13 for convenience.

The four light source units 10K, 10C, 10M, and 10Y respectively include the light source 10.

The light source unit 10K emits laser beams (hereinafter, "black beams") modulated according to black image information. The light source unit 10C emits laser beams (hereinafter, "cyan beams") modulated according to cyan image information. The light source unit 10M emits laser beams (hereinafter, "magenta beams") modulated according to magenta image information. The light source unit 10Y emits laser beams (hereinafter, "yellow beams") modulated according to yellow image information.

The first scanning lens 218a, the folding mirror 224a, the second scanning lens 220a, and the folding mirror 227a respectively correspond to the black beams.

The first scanning lens 218b, the folding mirror 224b, the second scanning lens 220b, and the folding mirror 227b respectively correspond to the cyan beams.

The first scanning lens 218c, the folding mirror 224c, the second scanning lens 220c, and the folding mirror 227c respectively correspond to the magenta beams.

The first scanning lens 218d, the folding mirror 224d, the second scanning lens 220d, and the folding mirror 227d respectively correspond to the yellow beams.

The laser beams emitted from the respective light source units are converged linearly by the deflection surface of the polygon mirror 230 in the sub scanning direction, and a deflection point in the polygon mirror 230 and a focused point on the surface of the corresponding photosensitive drum are conjugated in the sub scanning direction.

The polygon mirror 230 is a hexahedral mirror having a two-stage structure. The black beams from the light source unit 10K and the yellow beams from the light source unit 10Y are respectively deflected on the first hexahedral mirror, and the cyan beams from the light source unit 10M and the magenta beams from the light source unit 10C are respectively deflected on the second hexahedral mirror. That is, all the laser beams are deflected by the single polygon mirror 230.

The first scanning lenses 218a and 218b are arranged on one side (+X side) of the polygon mirror 230, and the first scanning lenses 218c and 218d are arranged on the other side (−X side) of the polygon mirror 230. The first scanning lenses 218a and 218b, and the first scanning lenses 218c and 218d are respectively laminated in the direction corresponding to the sub scanning direction (Z-axis direction).

The black beams from the first scanning lens 218a are imaged in spots on the photosensitive drum K1 via the folding mirror 224a, the second scanning lens 220a, and the folding mirror 227a.

The cyan beams from the first scanning lens 218b are imaged in spots on the photosensitive drum C1 via the folding mirror 224b, the second scanning lens 220b, and the folding mirror 227b.

The magenta beams from the first scanning lens 218c are imaged in spots on the photosensitive drum M1 via the folding mirror 224c, the second scanning lens 220c, and the folding mirror 227c.

The yellow beams from the first scanning lens 218d are imaged in spots on the photosensitive drum Y1 via the folding mirror 224d, the second scanning lens 220d, and the folding mirror 227d.

The folding mirror is respectively arranged so that optical paths from the polygon mirror 230 to the respective photosensitive drums agree with each other and an incident position and an incident angle of the laser beams on the respective photosensitive drums become equal to each other.

In the tandem color-copying machine 300 constructed as described above, the line image is formed on the respective photosensitive drums K1, C1, M1, and Y1 by the optical beams, whose use efficiency is improved. Accordingly, a high-definition multicolored image can be accurately formed on the recording medium.

In the embodiment described above, a case that the optical scanner of the present invention is used for a printer has been explained. However, the optical scanner is also suitable for, apart from a printer, image forming apparatuses such as a copying machine, a fax machine, or a multifunction product combining functions of these machines.

The image forming apparatus includes the optical scanner of the present invention. Therefore, the light use efficiency of the optical beams emitted from the light source can be improved, and therefore multicolor images can be formed accurately on the recording medium.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanner, comprising:
   a polygon mirror that deflects optical beams emitted from a light source; and
   an aperture member positioned between the polygon mirror and the light source, the aperture member including an opening through which the optical beams pass, wherein
   at least a smaller value of a size in a main scanning direction of the optical beams entering into the opening relative to a size of the opening in the main scanning direction and a size in a sub scanning direction, which is orthogonal to the main scanning direction, of the optical beams entering into the opening relative to a size of the opening in the sub scanning direction is equal to or larger than 1 and equal to or smaller than 2.

2. The optical scanner according to claim 1, wherein the size in the main scanning direction of the optical beams entering into the opening relative to the size of the opening in the main scanning direction is larger than the size in the sub scanning direction of the optical beams entering into the opening relative to the size of the opening in the sub scanning direction, and
   the size in the main scanning direction relative to the size in the sub scanning direction of the opening is larger than the size in the main scanning direction relative to the size in the sub scanning direction of the optical beams entering into the opening.

3. The optical scanner according to claim 1, wherein the size in the main scanning direction of the optical beams entering into the opening relative to the size of the opening in the main scanning direction and the size in the sub scanning direction of the optical beams entering into the opening relative to the size of the opening in the sub scanning direction are equal to or larger than 1 and equal to or smaller than 2.

4. The optical scanner according to claim 1, wherein the light source is a vertical-cavity surface-emitting laser.

5. The optical scanner according to claim 1, wherein the light source is a vertical-cavity surface-emitting laser array.

6. The optical scanner according to claim 4, wherein the size in the main scanning direction of the opening is larger than the size in the sub scanning direction, and a divergence angle of the optical beams emitted from the light source is larger in the main scanning direction than in the sub scanning direction.

7. The optical scanner according to claim 5, wherein the size in the main scanning direction of the opening is larger than the size in the sub scanning direction, and a divergence angle of the optical beams emitted from the light source is larger in the main scanning direction than in the sub scanning direction.

8. The optical scanner according to claim 6, wherein the light source has a current constriction structure, and the current constriction structure is different in the main scanning direction and the sub scanning direction.

9. The optical scanner according to claim 7, wherein the light source has a current constriction structure, and the current constriction structure is different in the main scanning direction and the sub scanning direction.

10. The optical scanner according to claim 6, wherein an emitting part of the light source that emits the optical beams has different sizes between the main scanning direction and the sub scanning direction.

11. The optical scanner according to claim 7, wherein an emitting part of the light source that emits the optical beams has different sizes between the main scanning direction and the sub scanning direction.

12. The optical scanner according to claim 10, wherein the size of the emitting part is smaller in the main scanning direction than in the sub scanning direction.

13. The optical scanner according to claim 11, wherein the size of the emitting part is smaller in the main scanning direction than in the sub scanning direction.

14. The optical scanner according to claim 6, wherein the size in the main scanning direction of the opening relative to the size in the sub scanning direction and the size in the main scanning direction relative to the sub scanning direction of the optical beams passing through the opening are approximately equal.

15. The optical scanner according to claim 7, wherein the size in the main scanning direction of the opening relative to the size in the sub scanning direction and the size in the main scanning direction relative to the sub scanning direction of the optical beams passing through the opening are approximately equal.

16. The optical scanner according to claim 1, wherein the light source is arranged rotatably about an axis orthogonal to the main scanning direction and the sub scanning direction, or arranged movably within a plane orthogonal to a direction of movement of the optical beams.

17. An optical scanner, comprising:
   a polygon mirror that deflects optical beams emitted from a light source; and
   an aperture member positioned between the polygon mirror and the light source, the aperture member including an opening through which the optical beams pass, wherein
   the aperture member is fixed to a non-adhesive object via an adhesive such that the aperture member is adjusted in either direction of a direction of movement of the optical beams and a direction orthogonal to the direction of movement, and after the aperture member is adjusted, the aperture member is fixed to the non-adhesive object via an intermediate member.

18. The optical scanner according to claim 17, wherein the aperture member is three-dimensionally adjusted before the aperture member is fixed to the non-adhesive object via an intermediate member.

19. The optical scanner according to claim 17, wherein the non-adhesive object is an adjusting mechanism that movably holds the aperture member in a direction orthogonal to the direction of movement of the optical beams.

20. An image forming apparatus that forms a multicolored image by superposing and fixing toner images formed based on a latent image for each color obtained from information relating to the multicolored image on a recording medium, comprising:
   the optical scanner according to claim 1;
   a plurality of photoconductors on which the latent image corresponding to each color is respectively formed by the optical scanner;
   a developing unit that manifests the latent images respectively formed on surfaces to be scanned of the photoconductors; and
   a transfer unit that superposes and fixes toner images manifested by the developing unit on the recording medium.

* * * * *